United States Patent [19]
Gordon et al.

[11] Patent Number: 4,982,610
[45] Date of Patent: Jan. 8, 1991

[54] DEVICE FOR MEASURING THE FLOW OF A GAS CONTAINING PARTICULATES

[75] Inventors: Roy G. Gordon, Cambridge, Mass.; Peter H. Hofer, Perrysburg, Ohio

[73] Assignee: Libbey-Owens-Ford Co., Toledo, Ohio

[21] Appl. No.: 398,718

[22] Filed: Aug. 25, 1989

[51] Int. Cl.$^5$ .............................................. G01F 1/42
[52] U.S. Cl. ................................. 73/861.62; 73/198; 73/706; 73/756
[58] Field of Search ............ 73/198, 706, 756, 861.47, 73/861.52, 861.61, 861.62, 861.63, 861.64

[56] References Cited

U.S. PATENT DOCUMENTS

| 2,058,654 | 10/1936 | Allton | 73/861.63 |
| 2,337,921 | 12/1943 | Petroe | 73/861.63 |
| 4,651,572 | 3/1987 | Albertz et al. | 73/861.63 |
| 4,671,109 | 6/1987 | Halmi | 73/756 X |

Primary Examiner—Herbert Goldstein
Attorney, Agent, or Firm—Marshall & Melhorn

[57] ABSTRACT

The flow of a gas containing entrained particulate matter may be accurately, reliably and continuously measured, utilizing an apparatus comprising a self-cleaning orifice, including counter-rotating continuously scraped cylinders, and thermophoretic pressure taps.

17 Claims, 2 Drawing Sheets

DEVICE FOR MEASURING THE FLOW OF A GAS CONTAINING PARTICULATES

FIELD OF THE INVENTION

This invention relates generally to a device for measuring the flow of a gas containing particulates, and more particularly, to a differential pressure type device for continuously and accurately measuring the flow of a gaseous stream containing entrained particulates, utilizing a self-cleaning orifice in conjunction with thermophoretic pressure taps.

BACKGROUND OF THE INVENTION

Differential-pressure-type flow measuring devices, employing a flow restricting orifice and pressure taps upstream and downstream therefrom connected to pressure sensing means, are generally used for measuring the flows of many types of fluids. These devices, however, cannot be effectively used to measure the flow rates of gaseous streams having significant quantities of entrained particulates therein. The orifice and open pressure taps of such a device quickly become clogged with the particulate matter, which causes erroneous or erratic pressure readings and may necessitate ceasing operations for a time sufficient to permit the removal and cleaning of these components. Several existing devices for measuring the flow of a gas containing entrained particulates rely on a cleaning system which operates in situ to blast or flush deposits from the surfaces of the orifice plate and open pressure taps. These devices, of course, cause erroneous readings during the cleaning cycles, and additionally allow for the steadily deteriorating accuracy of flow readings between cleaning cycles as the particulates slowly build over time.

U.S. Pat. No. 4,671,109 discloses a flow measuring device having pressure sensing elements which are inserted perpendicularly into the flow stream through gate valves. As the flow readings deteriorate, the pressure sensing element is withdrawn from the flow stream to a point just past the valve gate, the valve is closed, and finally the pressure sensing element is completely withdrawn and cleaned before being reinserted. This cleaning activity, of course, results in a period of time during which flow cannot be measured.

U.S. Pat. No. 4,498,347 discloses a flow measuring device utilizing an internal Pitot tube which, as it becomes clogged, is mechanically rotated within the flow stream so as to point generally downstream. Thereafter a blast of purge gas is forced backward through the Pitot tube, to remove adhered solids. Again, it is impossible to obtain accurate pressure readings during the purging cycles.

U.S. Pat. No. 4,651,572 discloses a flow measuring venturi arrangement, wherein the venturi orifice and flow conduit pressure tap are lined with a barrier layer of a porous, wear-resistant material. A rinsing gas may be either constantly or intermittently directed backward through the barrier layer into the flow stream, to keep the venturi orifice and pressure tap free from accumulations of particulates. This method, however, causes contamination of the flow stream by the rinsing gas. Furthermore, particulate fines will, over time, cause the barrier layer to slowly clog, resulting in inaccurate flow readings and the necessity of more severe rinsing.

U.S. Pat. No. 4,572,007 discloses a device and method for repelling particulates from a gas permeable surface using thermophoresis. A particulate-free gas sample may be drawn from the clean side of the hot permeable surface.

Finally, a publication entitled "Thin Film by Conveyorized Atmospheric CVD". by N. M. Gralenski, presented at the ISHM-Internepeon Technical Seminar in Tokyo, Japan, on Jan. 18, 1983, discloses on page 6 a self-cleaning orifice, including two counter-rotating cylinders and associated scrapers, in conjunction with open pressure taps which lead to a conventional pressure measuring device. The counter rotation of the cylinders allows the accumulated particulate material to be removed by the scrapers, thereby resulting in a constant orifice size at steady state operation. However, the disclosed open pressure taps allow the build-up over time of particulates therein, causing a steady deterioration of the accuracy of the flow readings. These deposits may be removed by disassembling the pressure taps, during which time flow readings are not available.

It must be noted that the prior art referred to hereinabove has been collected and reviewed only in light of the present invention as a guide. It is not to be inferred that such diverse art would otherwise be assembled absent the motivation provided by the present invention.

It would be desirable to construct an accurate differential-pressure-type continuous flow measuring device, suitable for measuring the flow of a gaseous stream containing entrained particulates, which is simple to operate and reliable. Such a flow measuring device would not require disassembly and cleaning, would not contaminate the flow stream with a purge gas, and would not give steadily deteriorating flow data due to the accumulation of particulates at the orifice and/or pressure taps.

SUMMARY OF THE INVENTION

Accordant with the present invention, it has surprisingly been discovered that the flow rate of a gas containing entrained particulate matter may be accurately, reliably, and continuously measured utilizing a novel apparatus, comprising:

(A) a flow channel, through which the gas flows;

(B) an orifice disposed within the flow channel, including at least a first surface and a second surface;

(C) means for causing the first surface and second surface independently to move in directions perpendicular to lines normal to the surfaces;

(D) scraping means, for intimately contacting at least a portion of the first surface and of the second surface, at all times while the surfaces are moving, whereby particulates which adhere to the first and second surfaces are removed by the movement of the surfaces past the scraping means;

(E) pressure taps, positioned so as to communicate with the flow channel upstream and downstream from the orifice, the pressure taps additionally in communication with pressure-measuring means, for measuring the pressure differential in the flow channel resulting from the passage of the gas through the orifice; and (F) thermophoretic heaters, positioned so as to heat the gas within the pressure taps, and thereby exclude particulates therefrom.

The apparatus of the present invention conveniently may be used to measure the flow of a gas containing entrained particulates, such as is generated for example during the chemical vapor deposition of a metal oxide on glass, or as a byproduct during the combustion of fuels or hydrocarbon-containing waste materials.

BRIEF DESCRIPTION OF THE DRAWINGS

The novel features that are considered characteristic of the invention are set forth with particularity in the appended claims. The invention itself, however, both as to structure and method of use, will best be understood from the accompanying description of specific embodiments, when read in connection with the attendant drawings, in which:

DETAILED DESCRIPTION OF THE PREFERRED EMBODIMENT

Figure 1:
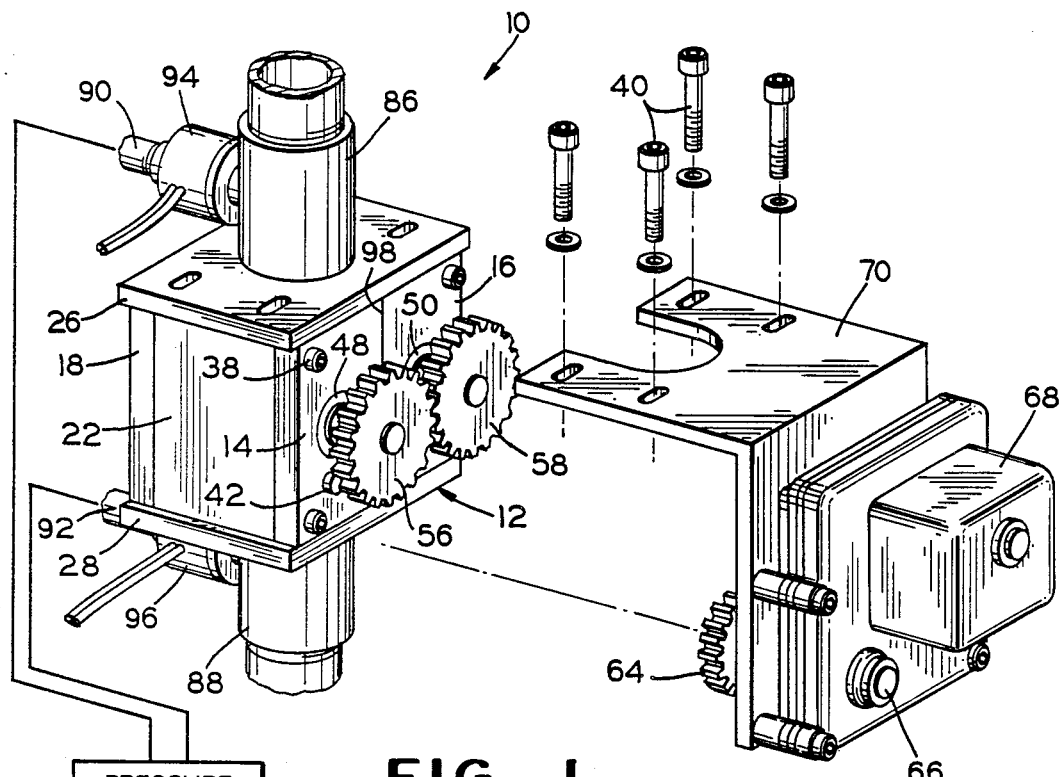
FIG. 1 is a perspective view of an apparatus embodying the features of the present invention.

Referring not to FIGS. 1 through 4, there is shown generally at 10 a flow measuring device, useful for measuring the flow of a gas containing particulate material. The device 10 comprises a body 12, including front plates 14 and 16, rear plates 18 and 20, chambers 22 and 24, top and bottom plates 26 and 28, and cylindrical rolls 30 and 32, which together define a flow conduit 34, and an orifice 36 within the flow conduit 34. The front plates 14 and 16, and rear plates 18 and 20, are conveniently affixed to the chambers 22 and 24, respectively, by threaded fasteners 38. The top plate 26 and bottom plate 28 are likewise secured to the chambers 22 and 23 by additional threaded fasteners 40. Resistance heating elements 42 reside within apertures in the chambers 22 and 24.

Cylindrical rolls 30 and 32, having parallel shafts 44 and 46, respectively, are journally mounted in bearing sets 48 and 50, which are set in the front and rear plates 14 and 18, and 16, and 20, respectively. The shafts 44 and 46 have narrow portions 52 and 54, respectively, for securely mounting thereto mating gears 56 and 58, respectively. The gears 56 and 58 engage each other and permit the rolls 30 and 32 to counter-rotate within bores 60 and 62 through the chambers 22 and 24, respectively. The mated gears 56 and 58 are driven by a drive gear 64, which is securely mounted on a drive shaft 66 and driven by a motor assembly 68. The motor assembly 68 is mounted on a support bracket 70, which in turn is fastened to the top plate 26 by threaded fasteners 40.

Scrapers 72 and 74 are adapted to engage portions of the surfaces of the rolls 30 and 32, respectively, and are slidably mounted within grooves 76 and 78, respectively, and urged toward the rolls 30 and 32 by compressed springs 80. Machined passageways 82 and 84 provide communication between the scrapers 72 and 74, respectively, and the flow conduit 34.

Inlet 86 and outlet 88 communicate with the flow conduit 34 and orifice 36 thereby defining a flow channel through which a gas containing particulate matter, whose flow rate is to be measured, may pass. Pressure taps 90 and 92 communicate with the inlet 86 and outlet 88, respectively, and are connected, at their remote ends, to conventional pressure-measuring means indicated at 93, such as for example diaphragms or piezoresistive transducers. Devices for measuring the pressure of a gas stream employing pressure taps are more fully set forth in Kirk-Othmer, "Concise Encyclopedia of Chemical Technology," John Wiley & Sons, N.Y., N.Y. (1985) at pp. 949-950.

Thermophoretic heaters 94 and 96 are attached to the pressure taps 90 and 92, respectively, and are positioned substantially near the inlet 86 and outlet 88, respectively. The illustrated thermophoretic heaters 94 and 96 are electrical resistance heaters which are designed to locally heat the gas contained within the pressure taps in the immediate vicinity of the inlet 86 and outlet 88, respectively. Other methods of applying heat to the pressure taps 90 and 92, such as for example by using steam jacketing, may of course be used.

In operation, a gas containing entrained particulates enters the inlet 86, and passes through the flow conduit 34 and orifice 36, thence out through the outlet 88. At steady-state operation, the flow is substantially constant through each of the inlet 86, flow conduit 34, orifice 36, and outlet 88, which together comprise the flow channel as the term is used herein.

Figure 2:
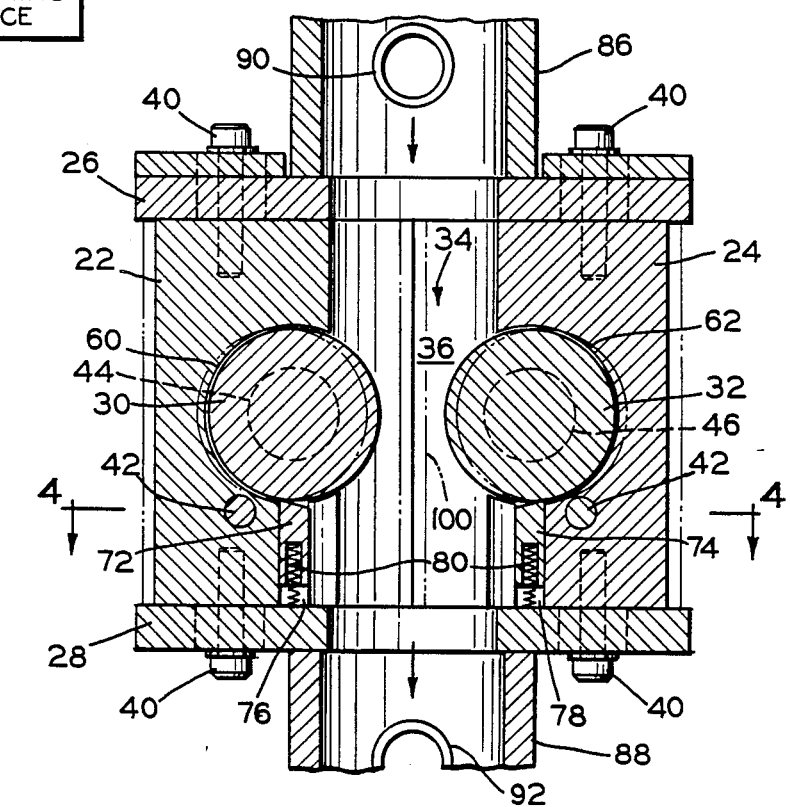
FIG. 2 is a vertical cross-sectional view of the apparatus of FIG. 1, illustrating the orifice within the flow channel.
Figure 3:
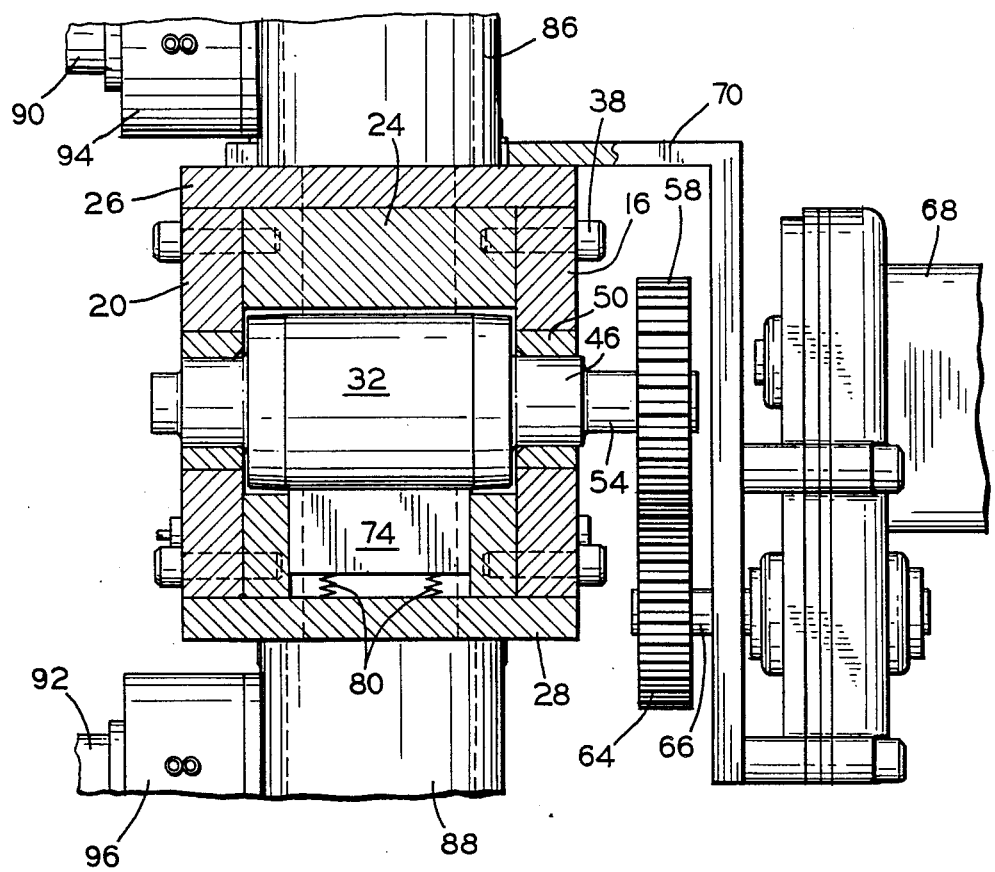
FIG. 3 is a side, elevational view, partly in cross-section, of the apparatus of FIG. 1, illustrating one of the orifice rolls and the drive mechanism.
Figure 4:
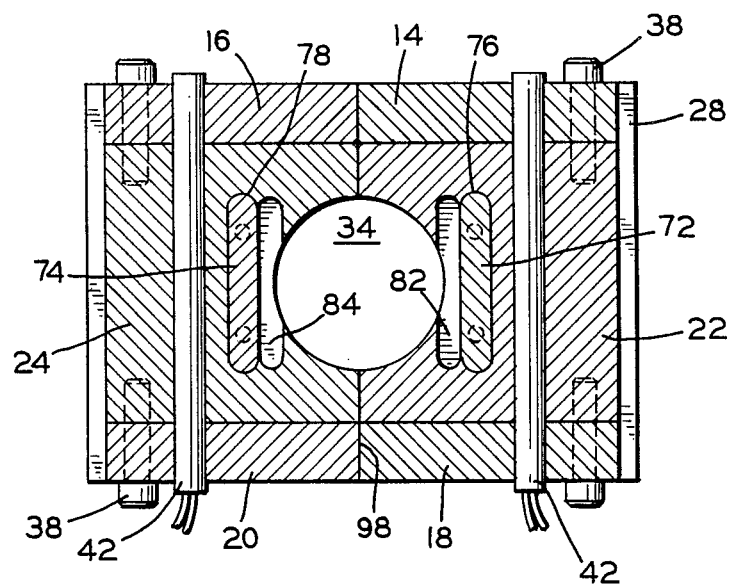
FIG. 4 is a horizontal cross-sectional view of the apparatus of FIG. 1, taken along line 4—4, illustrating the scrapers and flow conduit downstream from the orifice.

The clearances between the rolls 30 and 32 and the chambers 22 and 24, front plates 14 and 16, rear plates 18 and 20, are exaggerated in FIGS. 2 and 3, but in reality are such that substantially the entire gas flow stream passes through the orifice 36 between the rolls 30 and 32. The chambers 22 and 24 and associated rolls 30 and 32, respectively, are maintained at an elevated temperature by heating elements 42, to keep condensable components in the gas stream vaporized, and to repel particulates from all surfaces generally by thermophoresis.

The orifice 36 comprises the peripheral portions of the surfaces of opposed rolls 30 and 32, which are exposed to and communicate with the flow conduit 34. The orifice 36 is a constriction in the flow channel, which causes an increase in the velocity of the gas passing therethrough in relation to the velocity of the gas upstream from the orifice 36. The orifice 36 simultaneously causes a corresponding decrease in pressure within the flow channel. Therefore, an increase in the flow of gas through the flow conduit causes an increase in the pressure drop across the orifice 36. The relationship between pressure drop and flow rate, as a function of orifice size, is more fully set forth in Perry, Chilton, and Kirkpatrick, "Chemical Engineer's Handbook", McGraw-Hill Company, 1963. The orifice size may be increased in the illustrated embodiment of the present invention, by separating the chambers 22 and 24 at parting line 98 and inserting shims such as those shown in phantom at 100. This would necessitate larger diameter gears 56 and 58, and a smaller diameter drive gear 64.

Particulates entrained in the flowing gas stream tend to deposit upon the surfaces within the flow conduit 34. To maintain a constant orifice size, the rolls 30 and 32 are counter-rotated by means of the motor assembly 68 and associated drive gear 64 and meshed gears 56 and 58. The rolls 30 and 32 are counter-rotated so as to cause the surfaces exposed to the flow conduit 34 to individually move generally in the direction toward the outlet 88. As the exposed, moving surfaces of the rolls 30 and 32 engage the scrapers 72 and 74, respectively, the particulates adhered thereto are removed and carried by the flowing gas stream out the outlet 88. Polytetrafluoroethylene scrapers have been found particularly suitable for use in the present invention. At steady-state, the surfaces of the rolls 30 and 32, at the orifice 36, have a constant thickness of particulate matter adhered thereto. The exposed surfaces of the rolls 30 and 32 are continuously renewed, meaning that clean, scraped surfaces of rolls 30 and 32 continuously emerge from bores 60 and 62, respectively due to the continuous counter-rotation of the rolls 30 and 32.

Particulates entrained in the flowing gas stream are prevented from entering into and accumulating in pressure taps 90 and 92, by the action of the thermophoretic heaters 94 and 95, respectively. Thermophoresis is generally defined as motion induced in a particle due to a temperature gradient in the atmosphere surrounding the particle. Particles are thus induced to move from the hot to the cold regions. The thermophoretic heaters elevate the temperature of the gas within the pressure taps 90 and 92 over that of the gas in the inlet 86 and outlet 88. Although there is no precise temperature differential required in order to exclude particulates from the pressure taps 90 and 92 according to the present invention, temperatures in excess of 100° F. have been found to be sufficient. Thermophoresis permits the communication of the pressures of the gas in the inlet 86 and outlet 88, through the pressure taps 90 and 92, respectively, to the pressure-measuring device 92, while at the same time precluding particulates from entering therein. The thermophoretic heaters 94 and 96 effectively prevent the contamination of the pressure taps 90 and 92, respectively, with relatively little dependence upon the physiochemical properties of the particulates. The operation of the thermophoretic heaters 94 and 96 is not limited by the size of the suspended particulates, the composition, nor the concentration.

While certain representative embodiments and details have been shown for purposes of illustrating the present invention, it will be apparent to those ordinarily skilled in the art that various changes in applications can be made therein, and that the invention may be practiced otherwise than as specifically illustrated and described without departing from its spirit and scope. For example, the pressure differential may be measured utilizing pressure taps, wherein one of the taps is positioned substantially at the orifice. As another example, surfaces other than cylindrical surfaces may be used to form the orifice, provided that the individual surfaces continuously move in directions perpendicular to lines normal to the surfaces, and engage scraping means to remove accumulated particulates therefrom.

What is claimed is:

1. Apparatus for continuously measuring the flow of a gas containing entrained particulates, comprising:
   (A) a flow channel, through which the gas flows;
   (B) an orifice disposed within the flow channel, including at least a first surface and a second surface;
   (C) means for causing the first surface and second surface independently to move in directions perpendicular to lines normal to the surfaces;
   (D) scraping means, for intimately contacting at least a portion of the first surface and of the second surface, at all times while the surfaces are moving, whereby particulates which adhere to the first and second surfaces are removed by the movement of the surfaces past the scraping means;
   (E) pressure taps, positioned so as to communicate with the flow channel upstream and downstream from the orifice, the pressure taps additionally in communication with pressure-measuring means, for measuring the pressure differential in the flow channel resulting from the passage of the gas through the orifice; and
   (F) thermophoretic heaters, positioned so as to heat the gas within the pressure taps, and thereby excluding particulates therefrom.

2. The apparatus for continuously measuring the flow of a gas containing entrained particulates, according to claim 1, wherein the pressure-measuring means includes a diaphragm.

3. The apparatus for continuously measuring the flow of a gas containing entrained particulates, according to claim 1 wherein the pressure-measuring means includes a piezoresistive transducer.

4. The apparatus for continuously measuring the flow of a gas containing entrained particulates, according to claim 1, wherein the thermophoretic heaters maintain the temperature of the gas within the pressure taps at least about 100° F. greater than the temperature of the gas within the flow channel.

5. The apparatus for continuously measuring the flow of a gas containing entrained particulates, according to claim 1 wherein the first and second surfaces are each, independently cylindrical.

6. The apparatus for continuously measuring the flow of a gas containing entrained particulates, according to claim 1, including means to alter the size of the orifice.

7. The apparatus for continuously measuring the flow of a gas containing entrained particulates, according to claim 1, wherein the scraping means includes polytetrafluoroethylene scrapers urged into intimate contact with the first and second surfaces by compressed springs.

8. The apparatus for continuously measuring the flow of a gas containing entrained particulates, according to claim 1, wherein the means for causing the first and second surfaces to move includes a motor drive.

9. Apparatus for continuously measuring the flow of a gas containing entrained particulates, comprising:
   (A) a flow channel, through which the gas flows;
   (B) an orifice disposed within the flow channel, including at least a first cylindrical surface and a second cylindrical surface;
   (C) means for causing the first cylindrical surface and second cylindrical surface, independently to rotate about the axes of the surfaces;
   (D) scraping means, for intimately contacting at least a portion of the first cylindrical surface and of the second cylindrical surface at all times while the surfaces are rotating, whereby particulates which adhere to the first and second cylindrical surfaces are removed by the rotation of the surfaces past the scraping means;
   (E) pressure taps, positioned so as to communicate with the flow channel upstream and downstream from the orifice, the pressure taps additionally in communication with pressure-measuring means, for measuring the pressure differential in the flow channel resulting from the passage of the gas through the orifice; and
   (F) thermophoretic heaters, positioned so as to heat the gas within the pressure taps to a temperature at least about 100° F. greater than the temperature of the flow channel, thereby excluding particulates therefrom.

10. The apparatus for continuously measuring the flow of a gas containing entrained particulates, according to claim 9, wherein the pressure measuring means includes a diaphragm.

11. The apparatus for continuously measuring the flow of a gas containing entrained particulates, according to claim 9, wherein the pressure-measuring means includes a piezoresistive transducer.

12. The apparatus for continuously measuring the flow of a gas containing entrained particulates, according to claim 9, including means to alter the size of the orifice.

13. The apparatus for continuously measuring the flow of a gas containing entrained particulates, according to claim 9, wherein the scraping means includes polytetrafluoroethylene scrapers urged into intimate contact with the first and second cylindrical surfaces by compressed springs.

14. The apparatus for continuously measuring the flow of a gas containing entrained particulates, according to claim 9, wherein the means for causing the first and second cylindrical surfaces to rotate includes a motor drive.

15. Apparatus for continuously measuring the flow of a gas containing entrained particulates, comprising:
(A) a flow channel, through which the gas flows;
(B) an orifice disposed within the flow channel, including at least a first cylindrical surface and a second cylindrical surface;
(C) means for altering the size of the orifice;
(D) means for causing the first cylindrical surface and second cylindrical surface independently to rotate about the axes of the surfaces, including a motor drive;
(E) scraping means, for intimately contacting at least a portion of the first cylindrical surface and of the second cylindrical surface, at all times while the surfaces are rotating, including polytetrafluoroethylene scrapers urged into intimate contact with the first and second cylindrical surfaces by compressed springs, whereby particulates which adhere to the first and second cylindrical surfaces are removed by the rotation of the cylindrical surfaces past the scraping means;
(F) pressure taps, positioned so as to communicate with the flow channel upstream and downstream from the orifice, the pressure taps additionally in communication with pressure-measuring means, for measuring the Pressure differential in the flow channel resulting from the passage of the gas through the orifice; and
(G) thermophoretic heaters, positioned so as to heat the gas within the pressure taps to a temperature at least about 100° F. greater than the temperature of the gas within the flow channel, thereby excluding particulates therefrom.

16. The apparatus for continuously measuring the flow of a gas containing entrained particulates, according to claim 15, wherein the pressure-measuring means includes a diaphragm.

17. The apparatus for continuously measuring the flow of a gas containing entrained particulates, according to claim 15, wherein the pressure-measuring means includes a piezoresistive transducer.

* * * * *